United States Patent [19]

Cowherd et al.

[11] E Patent Number: Re. 33,176

[45] Reissued Date of Patent: Mar. 6, 1990

[54] METHOD FOR MEASURING DENSITY OF A BULK MATERIAL IN A STOCKPILE

[75] Inventors: David C. Cowherd, Centerville; Jerry L. DeWitte, Spring Valley; Kenneth A. Taylor, Dayton; William C. Whitaker, Xenia; Daniel S. Wolfe, Springfield; Gene A. Wolfe, Fairborn, all of Ohio

[73] Assignee: Bowser-Morner, Inc., Dayton, Ohio

[21] Appl. No.: 214,906

[22] Filed: Jun. 28, 1988

Related U.S. Patent Documents

Reissue of:

[64] Patent No.: 4,442,701
Issued: Apr. 17, 1984
Appl. No.: 470,028
Filed: Feb. 25, 1983

U.S. Applications:

[63] Continuation of Ser. No. 131,293, Dec. 9, 1987, abandoned, which is a continuation of Ser. No. 853,280, Apr. 17, 1986, abandoned.

[51] Int. Cl.[4] ..... G01N 9/24; G01N 9/02

[52] U.S. Cl. ..... 73/32 R; 73/433; 73/1 R; 250/269; 378/55; 378/56

[58] Field of Search ..... 73/1 R, 1 H, 32 R, 149, 73/432.1, 865, 865.6, 865.8, 866.4, 291, 433; 175/50; 378/55, 56, 54; 250/252.1 R, 358.1, 360.1, 259, 269

[56] References Cited

U.S. PATENT DOCUMENTS

| | | | |
|---|---|---|---|
| 2,344,771 | 3/1944 | Halliburton | 73/149 |
| 3,360,994 | 1/1968 | Childress | 73/433 |
| 3,372,281 | 3/1968 | Auld et al. | 378/54 X |
| 3,432,656 | 3/1969 | Smith et al. | 378/55 |
| 3,524,062 | 8/1970 | Rocoplan et al. | 250/358.1 |
| 3,907,034 | 9/1975 | Sumon, Jr. | 175/50 X |
| 4,325,438 | 4/1982 | Zuvela | 175/50 |
| 4,468,959 | 9/1984 | Roberts | 73/432 G X |
| 4,705,944 | 11/1987 | Coope | 250/269 X |

FOREIGN PATENT DOCUMENTS

| | | | |
|---|---|---|---|
| 197712 | 12/1977 | U.S.S.R. | 73/865.6 |

OTHER PUBLICATIONS

"The Accurate Determination of Coal in Stockpiles Utilizing Nuclear Methods"; by William E. Kattehenry Bowser-Morner, Inc. of Dayton, Ohio; Nov. 11, 1983; 17 page brochure.

Bowser-Morner Brochure "Coal Stockpile Inventories"; 5 pages; pub. 1982; by Bowser-Morner of Dayton, Ohio.

"Density of Stockpiled Coal Measured to 150 ft. Depth" *Electrical World*, Feb. 1, 1977, William M. Voorhis.

"Gravel Pack Evaluation", *Journal of Petroleum Technology*, Marvin R. Neal, Sep. 1983, pp. 1611-1616.

"Radioisotope Technique for Investigating Density of Bulk Material in a Coal Charge (Exchange of Experience)", *Industrial Lab(USA)*, vol. 36, No. 1, p. 69, Jan. 1970, Zublin.

Troxler Electronic Laboratories, Inc., Depth Density Gauges Instruction Manual, 1974.

Johnson Soils Engineering Company Stockpile Newsletter, vol. I, No. 2, pp. 1-2, Voorhis, 3-1983.

"Symposium on Nuclear Methods for Measuring Soil Density and Moisture", ASTM Special Technical Publication No. 293, Bonner S. Coffman et al., published Mar. 1961; 105 pages.

Progress Report No. 14, "The Applications of Isotopes to Industrial Problems", F. Rieke, May 20, 196.

Final Report "Gamma-Scattering Density Meters: Field Trials in Coal," R. A. Semmler, Mar. 1963, Report No. LAS-TR-161-35.

Final Report "Gamma-Scattering Density Meters: Analysis and Design with Applications to Coal and Soil," Semmler et al., Dec. 1961, Report No. LAS--TR-161-58.

Final Report "Neutron-Moderation Moisture Meters: Analysis of Application to Coal and Soil," R. A. Semmler, Sep. 1963, Report No. COO-712-73.

Isotopes and Radiation Technology, vol. 1, No. 2, Winter 1963-1964, pp. 160-174, entitled "Isotope Technology Development", Sec. II.

"Applications of Radiostope to the Coal Inventory," H.

Ohno, Karyoku Hatsuden, vol. 14, No. 1, 1963, pp. 7–11 (with partial translation), (Japanese Article No. 1.).
"Applications of the Neutron Moisture Meter, and Some Problems in the Measuring Technique," H. Ohno, Genshiryoku Kogyo, vol. 10, No. 9, 1964, pp. 33–38, (Japanese Article No. 2).
"Density Measurement of Coal Stock Pile by Gamma Radiation at the Chikujyo Steam Power Station," CRIEPI Report, No. 64078, 1964 (with partial translation), (Japanese Article No. 3.).
"Errors of Density Measurement of Compressed Coal Stock Pile by the Gamma Scattering Density Gauge", CRIEPI Report No. 64062, H. Ohno, 1965, (Japanese Article No. 4.).
"Density Measuring Test of Coal Stock Pile by Gamma Radiation at the Matsuyama Steam Power Station," CRIEPI Report, No. 65018, H. Ohno et al., 1965 (with full translation), (Japanese Article No. 5.).
"Errors of the Gamma Scattering Density Meter and its Design of Low-Density Measurement", SM 68/38, Reprint from Symposium on Radistope Instrumments in Industry an, Geophysics, vol. II, International Atomic Energy Agency, Vienna, 1966. (Article No. 6.).
"Improvement of the Surface Type Gamma-Penetrating Density Gauge and Its Error Analyses," CRIEPI Report No. 70100, H. Ohno et al., 1971, (Japanese Article No. 7.).
"A Proposal on Improving the Density Measurement of Coal Stock Pile at the Coal Inventory—Application of Gamma Density Gauges to the Density Measurement of Coal Stock Piles," CRIEPI Report No. 70109, Ohno et al., 1971, (Japanese Article No. 8.).

*Primary Examiner*—Tom Noland
*Attorney, Agent, or Firm*—Biebel, French & Nauman

[57] ABSTRACT

A method for determining the density of coal or other bulk material in a stockpile includes boring a calibration hole into the pile and collecting at least a portion of the cuttings thus obtained into a container. A series of readings are taken within the container with a nuclear depth-density gauge, and the weight of the cuttings and container volume is measured. The measured weight and volume are compared with the gauge readings to calibrate the gauge. A test hole is then bored substantially to the bottom of the stockpile, and a section of steel casing is inserted and partially pressed into the hole. A second section of casing is attached to the first and similarly pressed into the hole. In this manner, casing is extended the full depth of the hole. Readings are then taken at various depths therein with the nuclear gauge. From the data thus obtained, average density throughout the pile is determined.

11 Claims, 3 Drawing Sheets

METHOD FOR MEASURING DENSITY OF A BULK MATERIAL IN A STOCKPILE

Matter enclosed in heavy brackets [ ] appears in the original patent but forms no part of this reissue specification; matter printed in italics indicates the additions made by reissue.

*This is a continuation of Ser. No. 131,293 filed Dec. 9, 1987, now abandoned, which is a continuation of Ser. No. 853,280 filed Apr. 17, 1986, now abandoned.*

BACKGROUND OF THE INVENTION

The present invention relates to a method for determining the density of a bulk material at a plurality of points within a stockpile, and more particularly, to such a method that utilizes a nuclear depth density gauge for determining the density of the material at the various points throughout the pile.

Electrical generating companies and other businesses frequently keep in inventory large quantities of coal, stored in outdoor stockpiles. For business planning, financial reporting, regulatory and other reasons, it is often necessary to determine relatively accurately the quantity of coal contained within a stockpile. The quantity is customarily expressed in terms of its weight, but it is clearly impractical to determine the quantity by physically weighing the coal. Thus, the typical method relies instead upon determining the density of the coal and the volume occupied by the stockpile, from which the weight of the coal in inventory may be calculated.

Several methods are known for determining the density of coal within a stockpile. Since the density is not necessarily uniform throughout the pile, any method must rely upon a plurality of density measurements taken at various locations throughout the pile. In one method, known as the volumetric displacement method, a cylindrical rubber bag filled with water is used to determine the content of holes augered in a number of locations throughout the pile. The coal cuttings from each of the holes are collected and weighed. The volume of the hole from which the coal cuttings are removed is determined by placing the bag within the hole and filling the bag with water. The volume of water to fill the hole is recorded, and from the volume and weight of the cuttings, the density of the coal at that location may be calculated.

The displacement method presents a number of disadvantages. Measurements can be made only relatively near the top surface of the pile, and no density variation with increasing depth can be detected. The coal cuttings must be very carefully collected during augering, since any loss would affect the accuracy of measurement. The method is generally time-consuming and awkward to perform since, for example, the water placed into the rubber bag must be pumped back out prior to removal of the bag for subsequent measurements.

A second method for measuring density utilizes a nuclear depth density gauge for measuring density at a number of points in the pile. The gauge includes a probe consisting primarily of a source of radiation and a sensing element or detector. The detector is connected by a cable to a recording instrument or scaler. The density measurement is performed by lowering the probe through access tubing placed within a hole to the desired depth. The probe effectively measures the density of a generally spherically shaped volume approximately 5 inches in radius.

The detector within the gauge probe receives gamma radiation, the amount of which is recorded by the scaler. The probe source is a radioactive material that emits such radiation at a constant average rate. The gamma rays interact in various processes at the atomic level with the surrounding medium. The number of interactions, or scattering events, per unit time is a function of the density of the medium. The determination of sufficient quantities of the back scattered radiation within a certain fixed energy range and on a per unit time basis will give a statistically significant measure of the relative degree of scatter by materials of different densities.

One problem in using the nuclear depth density gauge is providing for insertion of the probe into the stockpile. A hole must be formed, and an access tubing inserted therein, into which the probe is placed. The probe is designed for use with 1.9 inch inner diameter, 2.0 inch outer diameter aluminum tubing, and the gauge is designed primarily for measurements in soil. In such a case, augering of a hole and insertion of the tubing is a relatively simple matter. In coal stockpiles, however, necessary measurement depths can be as great as 100 feet or more. The access tubing must fit snugly within the hole to achieve accurate results, but at such depths the aluminum access tubing does not possess sufficient strength to withstand its insertion the full length of the hole.

In one known method, a hollow-stem auger is used to advance the hole to a point above where the gauge reading is to be taken. The auger is disconnected from the drill rig but is left in place within the coal. A length of steel casing, having a split-spoon sampler attached to its lower end, is inserted into the hollow portion of the auger. The sampler and casing are then driven approximately 1 foot into the coal immediately beneath the auger, and the coal contained within the sampler is removed. The sampler is then replaced by a length of aluminum tubing at the end of the steel casing, which is then reinserted into the hole. The aluminum section is forced into the portion of the hole formed by the sampler, and a density measurement is taken therein. The casing is then removed, the auger is reattached to the drill rig, and the hole is advanced to just above the location of the next measurement.

This method represents a relatively complex and time-consuming procedure, particularly since a number of measurements must be taken at various depths along each of a number of holes in the stockpile. Since the accuracy of the density determination improves as the number of measurements is increased, it can easily be seen that lack of a simple method for installing access tubing along the full length of the hole represents a significant disadvantage.

A second problem associated with nuclear depth density gauge measurements in coal stockpiles results from the fact that such instruments are designed with the expectation that they will be used primarily in soil. In preparing the instrument for any use, a calibration must be determined to convert the back scattering radiation count received by the scaler into a corresponding density value. Such calibration is performed by the instrument manufacturer, but is performed such that the instrument is properly calibrated for use in typical soils. While such a calibration is sufficiently accurate for using the gauge at construction sites and the like, coal is sufficiently different material that the factory calibration values are not usable.

One method for recalibrating the gauge relies upon the difference in chemical make-up between coal and soil. The mathematical formula used in producing the calibration curve includes a constant factor which is related to the chemical composition of the material to be tested. Thus, using coal of a known density, it is possible to calculate a new constant which may then be inserted into the formula.

One disadvantage to this method, however, is that the chemical composition and relative proportions of coal from one stockpile to another is not constant, but rather various widely depending upon where the coal was mined. Thus, for the calibration to be accurate, it must be repeated prior to density measurement in each stockpile to be tested. Since the determination of the constant must be performed under carefully controlled conditions such that all other formula factors remain constant, this becomes a time consuming, tedious procedure.

The foregoing is equally applicable to density measurements of any other bulk material stored within a stockpile.

Accordingly, what is needed is a new method for determining the density of bulk material, particularly coal, stored within a stockpile. Such a method should utilize the nuclear depth density gauge due to its ease and simplicity of operation, but should reduce to a minimum the awkward drilling technique using the hollow-stem auger. Calibration should be relatively easy to perform, and capable of performance prior to measurement in each stockpile.

SUMMARY OF THE INVENTION

The present invention provides a method for determining the density of a bulk material such as coal in a stockpile. A calibration hole is bored into the pile, and at least a portion, but not necessarily all, of the coal cuttings obtained therefrom is collected into a container of a predetermined tare weight and volume. A length of steel casing is disposed within the container, extending the height of the container and remote from the walls thereof. As the container is filled, the coal is compacted to approximately a first density value. The inside of the length of casing is kept free from coal.

The probe of a nuclear depth density gauge is inserted into the length of casing and a series of timed readings are taken with the gauge. The probe is moved along the length of casing between each reading, such that each reading is taken at a location along the length of casing separated by a predetermined interval from the last preceding reading. Thus, each reading taken corresponds to one of a plurality of predetermined locations along the casing. The container and the coal cuttings held therein are then weighed.

A second container of predetermined tare weight and volume is filled, or the first container is refilled, with coal cuttings obtained from the calibration hole. During filling, the coal is compacted to approximately a second, different density. The gauge probe is inserted into the length of casing within the container, and a series of timed readings are taken at a plurality of locations along the casing. The second container and the coal cuttings therein are then weighed.

Similarly, a third container compacted to approximately a third density is prepared, has a plurality of gauge readings taken along the length of casing therein, and is weighed.

The density of the coal cuttings within the container or containers is calculated based on the volume, tare weight and loaded weight of the containers. The calculated densities of the coal are then compared with readings obtained with the gauge, whereby a calibration curve may be developed for the coal stockpile.

Following calibration of the nuclear depth density gauge, a test hole is bored substantially to the bottom of the stockpile. A first section of steel casing of an outer diameter substantially equal to the diameter of the test hole is inserted into the hole. A pressing force is applied to one end of the casing section until the section is pushed partially into the hole. A second section of casing is connected to the upper end of the first section, and a pressing force is applied to the upper end of the second section until the second section is pressed partially into the test hole, whereby the first section is pushed further into the test hole. Additional sections of casing are connected and pressed into the hole until the casing sections extend the full depth of the hole.

The probe of the nuclear depth density gauge is inserted into the casing sections and located at a predetermined depth along the sections. A series of time readings are taken with the gauge. The probe is moved along the casing sections such that at the beginning of each of the readings, the probe is at a location along the test hole separated by a predetermined interval from its location at the last preceding one of the readings. Thus, each of the readings taken corresponds to one of a plurality of predetermined depths along the test hole.

The readings thus obtained are compared with the calibration curve developed for the pile, whereby a density value for each test reading is obtained.

Accordingly, it is an object of the present invention to provide a method for determining the density of bulk material in a stockpile utilizing a nuclear depth density gauge; to provide such a method that includes a relatively simple and direct means for insertion of access tubing with which the gauge is used into the stockpile; to provide such a method that is usable at any depth within the pile; to provide such a method that includes relatively simple means for calibration of the gauge for use in the material, and to provide such a method in which the calibration method is sufficiently simple to enable its use prior to measurements within each of a number of stockpiles. [p Other objects and advantages of the present invention will be apparent from the following description, the accompanying drawings and the appended claims]

*Other objects and advantages of the present invention will be apparent from the following description, the accompanying drawings and the appended claims.*

DETAILED DESCRIPTION OF THE PREFERRED EMBODIMENT

The method of the present invention for determining the density of a bulk material at a plurality of locations within a stockpile makes use of a nuclear depth density gauge for density readings. The method, which is particularly adapted for use in coal, is also usable with a number of other materials such as bauxite, salt, and the like, or other bulk materials capable of supporting a boring, such materials being generally referred to as "cohesionless". Materials such as grain or dry sand, within which a boring will have a strong cave-in tendency, are generally not suitable, nor are materials such as large pieces of scrap metal which have large amounts of open space between material particles. Thus, while the present invention is discussed with reference to use with a coal stockpile, it will be understood that the invention encompasses the practice of the method with other bulk materials as well.

In the preferred embodiment, the nuclear gauge is a Troxler model No. 1351 nuclear depth gauge with an 8 millicurie cesium-137 source, which is coupled to a Troxler model No. 600 scaler. Although the invention is not limited to these particular devices, the two preferred devices are manufactured by Troxler Electronic Laboratories, Inc. of Research Triangle Park, N.C.

The bulk of the density determination method is performed in the field at the stockpile site, and consists essentially of two stages. The nuclear gauge utilized for density determination does not provide a signal that can be displayed directly as a density measurement on the scaler. The reading obtained represents a measurement of the number of nuclear back scattering events recorded by the gauge sensor, and this number of events must then be converted into a meaningful density measurement. Normally, the gauge is provided with various graphs and/or charts prepared at the factory for the purpose of converting the count number to a density measure. Since the relationship between counts and density is dependent upon the atomic structure of the material being tested, however, these factory calibrations are prepared for maximum accuracy within a broad range of materials that it is expected the gauge will be used in. Such gauges are typically used in soils, and since the atomic structure of coal is significantly different from soils, the factory calibrations are inappropriate for use for density determinations in coal or other materials.

Thus, the first stage of the density determination of a stockpile is the production of satisfactory calibration curves for use in coal.

Figure 1:
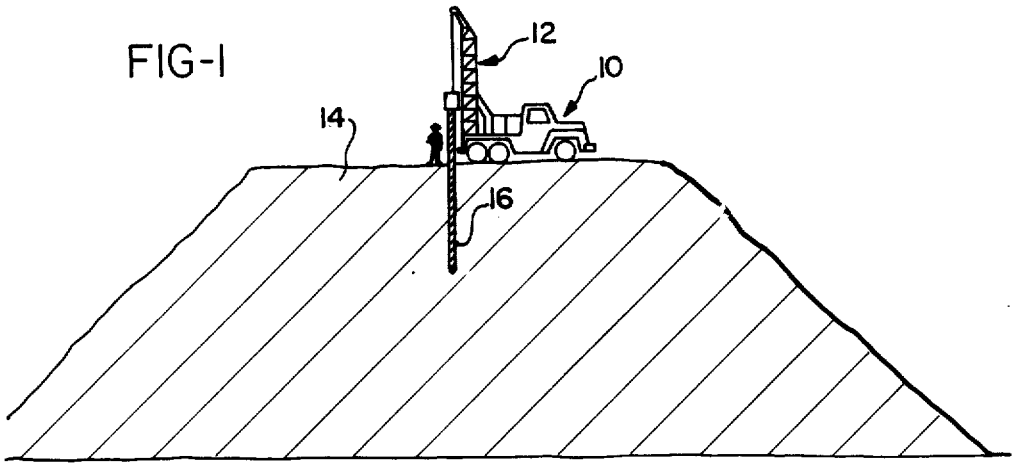
FIG. 1 is a cut-away view of a coal stockpile showing a truck-mounted drill ring as used in the method of the present invention.

As seen in FIG. 1, a truck 10 having a conventional boring rig 12 mounted thereon is driven onto the coal stockpile 14. A number of borings 16 are made at various locations on the stockpile 14 using, for example, 6 inch O.D. continuous flight augers. These augers, as well as augers used later within the method, may be any appropriate commerically available augers, such as those available from McLaughlin Mfg. Co. of Plainfield, Ill. These borings 16, which typically will number at least two located randomly along the stockpile 14, are made to the bottom of stockpile 14, and the coal cuttings resulting from the borings are collected.

Figure 2:
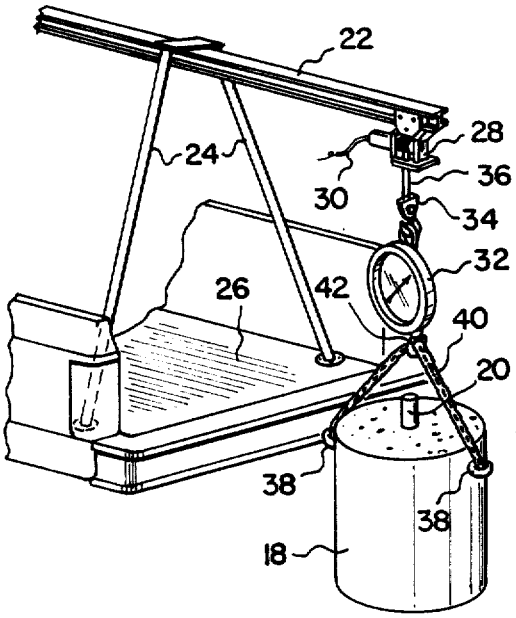
FIG. 2 is a perspective view of the rear portion of a pick-up truck showing apparatus for weighing loaded calibration barrels.

Enough cuttings are collected to fill a calibration barrel 18, shown in FIG. 2. Three calibration barrels are prepared, with one barrel 18 used three times, or three such barrels 18 used once each. Barrel 18 is preferably constructed from heavy gauge steel, and is open at the top. A length of steel casing 20, preferably of 1.90625 (1-29/32) inch inner diameter and 2.25 (2¼) inch outer diameter is permanently mounted within barrel 18 so as to extend vertically from the base of barrel 18 to slightly above its upper end. Casing 20 is further mounted so as to be exactly centered within barrel 18.

Each barrel 18 preferably has a volumetric capacity of approximately 8 cubic feet, although prior to initial use, the exact volume must be determined and recorded. Additionally, the empty or tare weight of barrel 18 must be determined and recorded.

The coal cuttings are placed into each of the calibration barrels 18 to achieve three different degress of compaction for three different densities. The approximate values for each density are preselected, with the lowest density approximating the lowest density value expected to be encountered within the stockpile, the highest value approximating the highest expected value, and a third value that is intermediate of these values. Care must be taken while filling the barrels to avoid getting any coal inside the casing 20.

The coal cuttings are placed fairly loosely into the first of the calibration barrels 18. The coal must be carefully placed within the barrel 18, however, so as to achieve relatively uniform density throughout the barrel. The barrel 18 is filled to its brim and levelled off. In one example, this will result in approximately 425 pounds of coal within the barrel, to result in a density of approximately 55 pounds per cubic foot.

Figure 3:
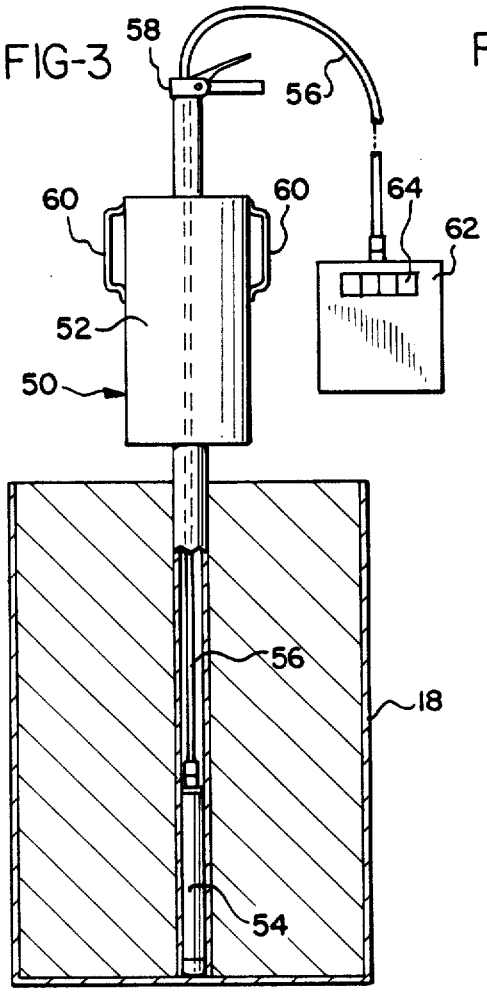
FIG. 3 is a cut-away view of a loaded calibration barrel showing a nuclear depth-density gauge mounted for the taking of calibration readings.

Following the loading of barrel 18, the nuclear depth density gauge is used to take a series of density readings within barrel 18. As seen in FIG.3, the nuclear gauge 50 includes a shield 52 and a probe 54. Probe 54 contains the radioactive source and the back scattering detector, along with a small preamplifier for amplifying the counts received by the detector. A cable 56 is connected to probe 54, for transmitting the electrical signals corresponding to counts recorded by the detector. Cable 56 passes through shield 52, which is constructed to be mountable at the upper end of a length of approximately sized tubular casing, such as casing 20. A simple cable clamp 58 is provided for cable 56 at the upper end of shield 52, so that probe 54 may be suspended at a desired distance beneath shield 52. Additionally, probe 54 is retractable within shield 52, the walls of which are constructed to provide effective radioactive shielding. Shield 52 further includes a pair of handles 60 to facilitate movement thereof.

Cable 56 connects probe 54 with a scaler 62 having an appropriate digital readout 64. Scaler 62 serves to accumulate the counts collected by the sensor of probe 54, and displays the total number of counts so recorded on display 64. Scaler 62 includes appropriate controls (not shown) and an internal clock means, so that counts may be recorded and displayed to correspond to accumulations thereof over a predetermined selected time period.

The nuclear gauge 50 is turned on and permitted to stabilize. Since shield 52 includes radioactive shielding, the interior of shield 52 serves as a controlled environment. The probe 54, which can be drawn into shield 52 when the gauge 50 is not is use, is left within shield 52 for the taking of several standard counts to insure proper operation of gauge 50 prior to use. A series of such counts, for example, 10 counts of a duration of 1–4 minutes each, is taken and recorded.

Following the taking of the standard counts, the nuclear gauge probe 54 is removed from the interior of shield 52 and inserted into casing 20 within calibration barrel 18. Shield 52 is then placed on top of casing 20, as shown in FIG. 3. Probe 54 is lowered to the bottom of casing 20, and then is raised two inches therefrom. Since the radioactive source is contained within probe 54 at its lower end, the effective site of a reading taken with probe 54 is at its lower end.

A reading for a predetermined time period is taken with probe 54 positioned two inches above the bottom of barrel 18. The count is recorded, the probe is raised an additional two inches, and a second reading is taken. In similar fashion, readings are taken and recorded at two inch intervals along casing 20.

The loaded calibration barrel 18 is then weighed. Referring back to FIG. 2, the preferred apparatus for weighing the loaded barrels 18 may be seen. An overhead beam 22 is supported by two pairs of legs 24 (only one pair shown) that are in turn mounted to the bed of a conventional pick-up truck 26. An electrically driven winch 28 is mounted to the distal end of beam 22, and includes the necessary wiring 30 extending to an appropriate control (not shown). A conventional spring scale 32, having a preferred capacity of 1,000 pounds, is suspended from hook 34 attached to the winch cable 36.

A pair of rings 38 are permanently attached opposite each other near the top of the exterior of barrel 18. A length of chain 40 is connected between rings 38. Winch 28 is operated to lower hook 34 so that the hook 42 of attached scale 32 may be engaged with chain 40. Winch 28 is then reversed, so as to lift barrel 18 from the ground through scale 32.

The weight of the loaded barrel 18 is then recorded from scale 32. By subtracting the tare weight of barrel 18, the net weight of the coal contained within barrel 18 is obtained. The barrel 18 is then lowered and disconnected from scale 32.

Following weighing, calibration barrel 18 is either emptied or a second calibration barrel 18 is used. The barrel 18 is filled with the coal cuttings, which are uniformly tamped during placement within barrel 18. The coal is compacted within the barrel to a second approximate density. For example, approximately 500 pounds of coal may be placed therein, for an approximate density of 65 pounds per cubic foot. The nuclear gauge 50 is then used to take a series of readings along casing 20 of the second barrel, in a manner identical to the taking of the readings within the first barrel. The barrel 18 is then weighed using the apparatus shown in FIG. 2.

Once it has been weighed, the calibration barrel 18 is either emptied or a third calibration barrel is used. The coal is placed within the barrel and uniformly tamped to a greater degree than the second barrel so that, for example, approximately 580 pounds of coal are placed within the barrel. An approximate density of 75 pounds per cubic foot is thus produced. During the filling of the third calibration barrel, it may be necessary to spray water uniformly throughout the coal within the barrel to achieve the desired compaction.

A series of readings are taken within the third calibration barrel 18 using the nuclear gauge and the barrel is then weighed, in a manner identical to that used with the first two barrels.

Sufficient data has now been acquired to enable calibration of the nuclear gauge for the actual density measurements. Since the calibration calculations need not be made in order for the measurements to be taken, however, the data will typically be recorded and then analyzed at a later time or relayed to a remote location for immediate analysis. This minimizes the actual time that must be spent at the stockpile site.

Details of the calibration calculations will be discussed in detail below. Once the calibration readings have been taken with the nuclear gauge 50 for the particular coal within the stockpile 14, the second stage of the method for density determination, the taking of density readings within the coal pile, may be begun. It should be recognized, however, that if desired, the taken of readings within the stockpile may be performed prior to the taking of calibration data. The first of a series of test bores are made within the stockpile 14, each bore similar to bore 16 shown in FIG. 1, and extending to the bottom of pile 14. Each test bore is made with a 2.25 inch outer diameter continuous flight auger. After the auger is removed from the bore, a section of 2.25 inch outer diameter, 1.90625 inch inner diameter steel casing is inserted into the bore and pushed thereinto until all but the uppermost portion of the section is contained within the bore. While the given dimensions represent preferred values for augers and casing, it should be recognized that bore diameter and casing outer diameters should be substantially equal so that the outer casing surface and the coal are substantially in contact.

A second section of casing is then attached to the first, and is pushed into the bore until all but its uppermost end is contained within the bore. In similar fashion, sections of casing are connected and inserted into the bore until the casing extends the full length of the bore to the bottom of the stockpile 14. The sections of casing used within the bore are preferably of a commercially available type generally referred to as BXWL, available for example from Christensen Dia-Min Tools, Inc. The casing is typically available in sections of 5–10 feet. The advantage of this particular type of casing is that the threads for joining the sections are provided such that both the inner and the outer surfaces of the casing are essentially smooth and continuous, even at the section joints.

It is important to note that the casing utilized within the present method is formed from steel, while the nuclear gauge is intended for use with aluminum casing. Moreover, nuclear gauges of the general type utilized in the present invention are typically supplied (and factory calibrated) with a 2 to 3 millicurie source, whereas an 8 millicurie source is used for the present invention to obtain necessary radiation penetration through the steel casing. Nonetheless, it will be recognized that since the nuclear gauge is recalibrated prior to use within the particular stockpile, and since the calibration is made within a length of steel casing, the change in casing material and the source is accounted for within the calibration procedure.

It is additionally important to note that in inserting the casing into the bore, the casing is generally pushed with a continuous force as it is inserted. This is easiest accomplished by utilizing the hydraulic auger advance mechanism of the drilling rig, which supplies sufficient pushing force to insert the casing into the bore. The casing may also be inserted by other force appliation means and is not necessarily limited to pushing forces. For example, a vibration driver may be adapted to insert the casing into the hole. Driving the casing by a series of blows should be avoided, however, since this will disturb the coal surrounding the casing, possibly resulting in an inaccurate density measurement. It has been found that limited driving by blows may be necessary in some instances to insert the casing, but such driving should be used only as needed.

It should be recognized that any required driving of the casing by blows is made possible only through use of the steel casing. Driving of the aluminum casing typically used with nuclear gauges, or even insertion into the stockpile of such casing by application of a continuous pushing force, will tend to bind, deform or otherwise damage the casing.

To further facilitate the insertion of casing into the bore, a cone tip (not shown) is threadingly connected to the lower end of the lowermost length of casing. This tip also serves to prevent coal from entering the casing during insertion.

Figure 4:
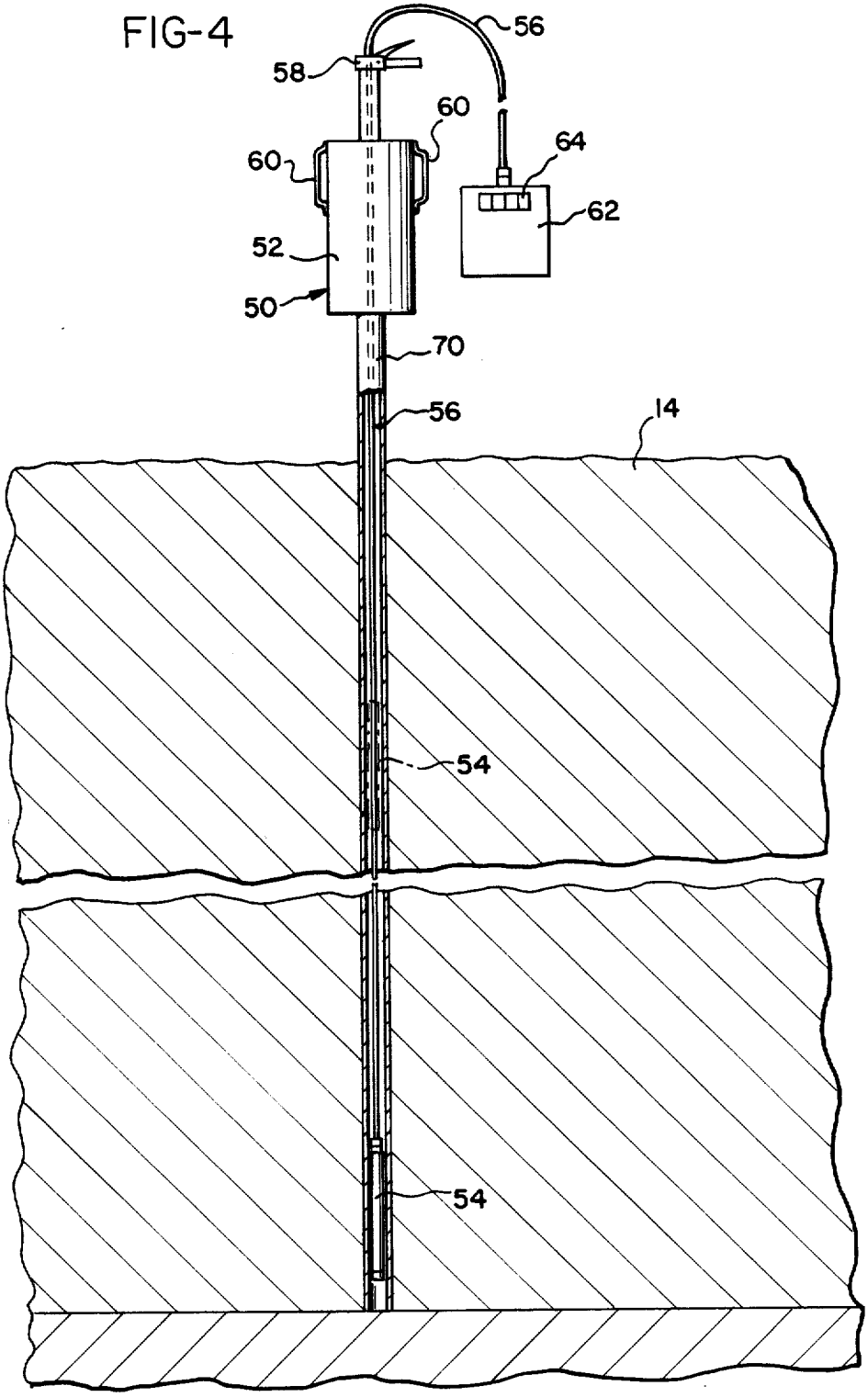
FIG. 4 is a cut-away view of a portion of a stockpile showing the casing inserted thereinto and the nuclear depth-density gauge mounted for the taking of test readings.

Once the casing is positioned within the bore, the ptobe 54 of the nuclear gauge 50 is inserted into the casing and lowered to the bottom thereof. The gauge shield 52 is positioned on the top of casing 70 as seen in FIG. 4. A density reading of the same time period as the calibration counts is taken and recorded. The probe 54 is then raised a predetermined interval along the casing 70, and a second reading is taken and recorded. In similar fashion, readings are taken at predetermined intervals along the entire length of casing 70. The readings thus obtained are then recorded for later conversion to density values corresponding to the locations within the stockpile 14 at which the readings were taken.

As will be explained in greater detail below, a number of bores are augered at a plurality of locations on the stockpile 14, with a series of readings taken with the gauge 50 along the length of each bore. The procedure for each bore will, of course, be identical to that described above.

Although the nuclear depth density gauge 50 is highly accurate for measurements within the stockpile 14, its accuracy is significantly reduced with the top 1 or 2 feet of coal within the pile. Typically, however, this region of the pile frequently represents an area where variations with density relative to the remainder of the pile may be expected to be found. Thus, determination of density at a plurality of points within this region is highly desirable.

Coal density within this region is therefore determined through use of a nuclear surface density gauge, with the preferred instrument being a Troxler model No. 3401-B surface moisture-density gauge, manufactured by Troxler Electronic Laboratories, Inc.

Figure 5:
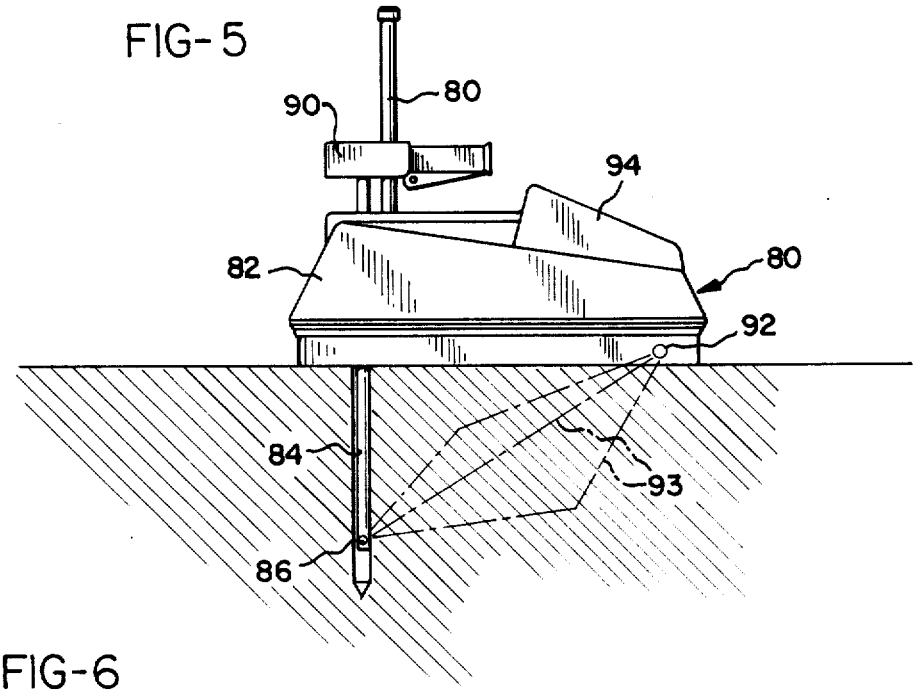
FIG. 5 is a side elevational view showing a nuclear surface density gauge as used in the method of the present invention.

As seen in FIG. 5, the surface gauge 80 includes a radioactively shielded housing 82 through which a probe 84 is vertically movable. A radioactive source 86, preferably an 8 millicurie cesium-137 source, is mounted near the lower end of probe 84. An index rod 88 is fixedly mounted to housing 82, and a squeeze-type clamp 90 is operably positioned on rod 88. Clamp 90 is attached to the upper end of probe 84, so that probe 84 may be raised or lowered by clamp 90, and once probe 84 is in a desired position, clamp 90 may be used to secure the rod therein by securing clamp 90 to index rod 88.

One or more gamma ray detectors 92 are mounted to gauge housing 82 for receiving gamma radiation from source 86 following passage of the radiation through the material to be tested along, for example, lines 93. A control portion 94 having an appropriate control panel and digital read-out (not shown) is also provided.

As with the depth density gauge 50, the operation of the surface gauge 80 is dependent upon interaction at the atomic level of gamma radiation from source 86 with the atoms of the material being tested. A certain portion of the radiation will be scattered such that it will be received by the detector 92, with the amount of radiation received being inversely proportional to the density of the material. Provision is made within the controls of the gauge 80 for the taking of accurately timed readings over a preselected interval, which are then readable from the digital display.

For the same reasons as with the depth density gauge, the surface gauge 80 must be calibrated prior to use on any individual stockpile. The gauge 80 is turned on and permitted to stabilize, following which a series of standard counts is taken to insure proper gauge operation. The source end of probe 84, which is carried within shielded housing 82 when gauge 80 is not in use, is left within housing 82 for the standard count.

For use of gauge 80 within the material to be tested, a metal rod (not shown) of a diameter identical to probe 84 is provided. The rod is driven with a hammer or other means into the material to a point just below the maximum depth at which the gauge 80 is to be used. The rod is removed, and the gauge 80 is positioned on the surface such that probe 84 can be inserted into the hole formed by the rod. For accurate results, it is necessary that the gauge housing 82 be in contact with the material surface, and thus prior to measurement, it may be necessary to level the surface.

The calibration procedure for the surface gauge 80 is generally similar to that used for the depth density gauge 50. A series of three calibration barrels are prepared, which may be performed using three barrels or by using a single barrel three times. The barrel is generally similar in appearance to that shown in FIG. 2, but does not include a centrally mounted length of casing. Additionally, since the depth at which the surface gauge is used is less than that for the depth gauge, it is preferred that a smaller calibration barrel to be provided so as to reduce the amount of coal required and the time needed for filling and compacting the coal within the barrel. Thus, a barrel having a preferred volume of approximately five cubic feet is used. The coal used for the calibration is collected randomly from a preferred minimum of six locations on the surface of the stockpile until sufficient coal is accumulated to fill the calibration barrel. As with the depth gauge, each barrel is compacted to a different approximate density corresponding to the expected high and low density values, plus one intermediate value. In one example, about 300 pounds of coal is placed into the first barrel, for an approximate density of 60 pounds per cubic foot. After filling, a series of readings are taken within the coal within the barrel by gauge 80. A hole is made in the coal near the center of the barrel, and the gauge 80 is positioned and the probe 84 inserted into the hole. Three one-minute test counts are made with the gauge in this position. A second hole is then made in such a location that the gauge can be rotated 90° on the coal surface and another set of three readings is taken and recorded. The barrel is then weighed with the apparatus shown in FIG. 2.

A second barrel is then prepared with, for example, about 350 pounds of coal for an approximate density of 70 pounds per cubic foot. The reading and weighing procedure is repeated for this barrel, and then a third barrel is prepared with, for example, about 400 pounds of coal, compacted to approximately 80 pounds per cubic foot. The procedure is then [repreated] *repeated* for this third barrel.

Once the calibration data has been taken with the gauge 80, a series of readings is taken along the surface of the stockpile. (This sequence may, of course be reversed.) The data is then recorded for later analysis.

Once all the data has been collected at the stockpile site in the manner described above, it may be analyzed to determine the coal density within the stockpile and, hence, the quantity of coal contained therein. The calculations will be described as performed with the data collected by the depth gauge 50. It should be understood, however, that the calculation regarding the data obtained with the surface gauge 80, while performed independent from those pertaining to the depth gauge, are accomplished in an identical manner.

The average calibration count taken within each of the three calibration barrels is determined first. This value represents the average of the calibration count readings taken at the two inch intervals throughout the depth of each calibration barrel.

The actual density of the coal in pounds per cubic foot for each calibration barrel is determined by dividing the measured weight of the coal in the barrel by the volume of the barrel. The calibration count average value and actual density for each of the calibration barrels are then used to develop the calibration curve for the depth gauge 50.

The calibration curve is developed from the mathematical relationship linking the count values with the actual coal density at the point where the count value is obtained. While the actual relationship is relatively complex, the relationship may be approximated over the range of density values typically encountered in coal stockpiles by the expression $$N = Ae^{B\rho},$$

where N is the measured count value, A and B are constants, and $\rho$ is the actual density at the point in question. It should be readily seen that this equation may be rewritten as $$\ln N = B\rho + \ln A,$$

which represents the slope-intercept form of the equation for a straight line. The three data points generated as a result of the calibration measurements are then used by a computer to determine the slope and intercept of the straight line using the "least squares fit" method. The straight line, which may be preferably plotted on a semi-logrithmic graph for ease of use, as seen in FIG. 6, is used as the calibration curve for the data points developed within the stockpile.

Figure 6:
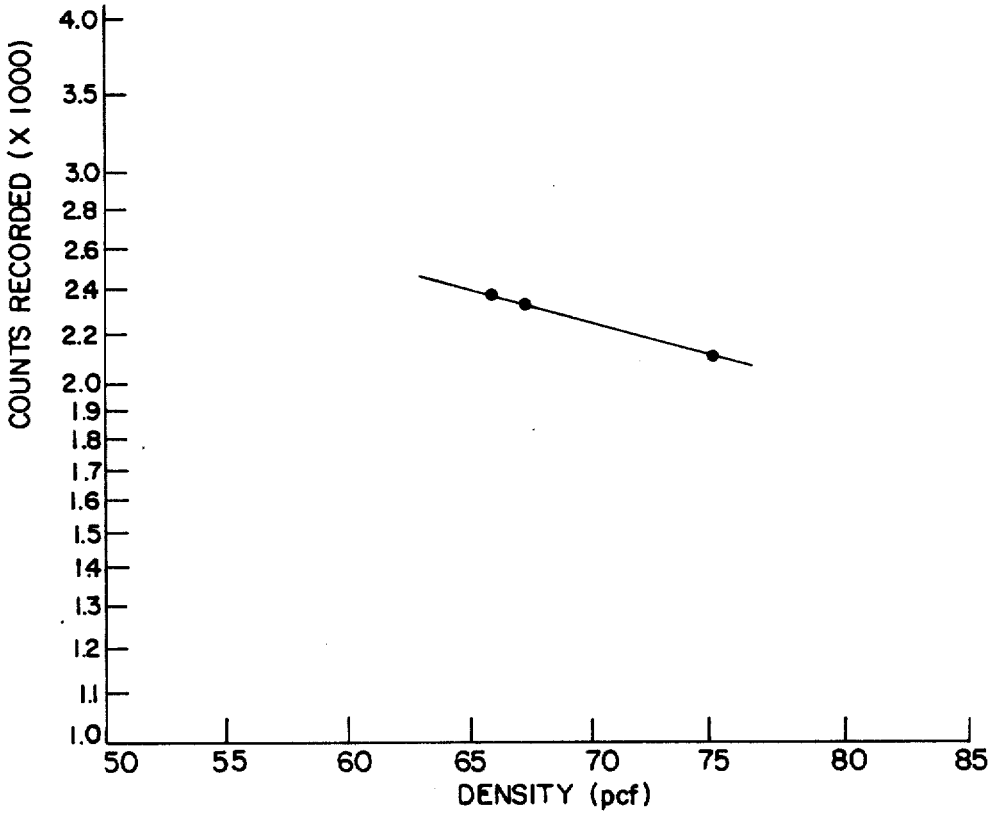
FIG. 6 is an example of a typical calibration curve generated as part of the method.

The actual density values may be determined either graphically by reference to a plot such as shown in FIG. 6, or the data may be fed into the computer for calculation using the equation set forth above. Due to the enhanced speed and accuracy obtained by using the computer, this latter method is preferred.

In an identical fashion, the data collected with the surface gauge is converted to density value.

Prior to the collection of data at the stockpile site, it is necessary to determine the number of data points to be taken and, hence, the number of bores to be made into the stockpile. While the actual decision is in large part based upon the needs and desires of the particular stockpile owner, the preferred method for determining the necessary number of data points utilizes a statistical approach that takes into consideration the variation in density values normally expected to be observed within a stockpile.

The preferred statistical approach is based upon the relationship that the mean of a sample population reflects the central tendency of the actual population, if the sample size is of a sufficient magnitude. The sample size is determined by using the following equation $$n = [(2Z_{\alpha/2}\sigma)/E]^2,$$

where n is the sample size, $Z_{\alpha/2}$ is the effect of the confidence level for a normal distribution E is the confidence width, and $\sigma$ is the standard deviation of the population distribution.

Provided that the population is normally distributed, the mean of the sample values approximates the mean value of the population. Thus, $Z_{\alpha/2}$ is taken from standard normal curves for the desired confidence level. In making the present analysis, the confidence level was selected as 98%, for which $Z_{\alpha/2}$ is 2.33. The confidence width was selected as $\pm 2$ pounds per cubic foot, and the standard deviation was taken from historical records for typical coal piles.

After the sample size is determined, the number of borings is determined taking into account the desired sample separation and the approximate depth of the proposed borings. A random number system is then used to locate the borings on the pile.

Once the density test values are obtained, they are averaged and a standard deviation of the sample population is determined. The newly calculated standard deviation and the desired confidence level and width are used to ascertain whether the actual sample size is sufficient. If the sample size is sufficient, then the mean density determined by the testing procedure represents the mean density of the coal stockpile within the limits of the control [therion] *thereon.*

At some point before, during, or after the density determination with the stockpile has been made, the volume occupied by the pile is determined through a conventional, known method, such as aerial photography. The volume thus obtained is multiplied by the main density value, yielding the total quantity by weight of coal or other material contained within the stockpile.

While the methods herein described constitute preferred embodiments of this invention, it is to be understood that the invention is not limited to these precise methods, and that changes may be made therein without departing from the scope of the invention which is defined in the appended claims.

What is claimed is:

1. A method of determing the density of cohesionless bulk material in a stockpile, comprising the steps of:

completely boring a test hole substantially to the bottom of said stockpile;

following complete boring of said hole, positioning one end of a first section of steel casing of an outer diameter substantially equal to the diameter of said test hole at or near the opening to said hole;

applying a first force to the opposite end of said first section until said section is pushed partially into said hole;

connecting a second section of casing to the upper end of said first section;

applying a force substantially equivalent to said first applied force to the upper end of said second section until said second section is pressed partially into said test hole, whereby said first section is driven further into said test hole;

connecting additional sections of casing and inserting said sections into said test hole until said casing sections extend the full depth of said test hole;

after said casing sections extend the full depth of said hole, inserting the probe of a nuclear depth-density gauge into said test hole and locating said probe at a predetermined depth along said hole, said probe having a length of cable attached thereto;

taking a series of timed readings with said gauge; and moving said probe along said test hole such that at the beginning of each of said readings following the first thereof, said probe is at a location along said test hole separated by a predetermined interval from its location at the beginning of the last preceding one of said readings, whereby each of said readings taken corresponds to one of a plurality of predetermined depths along said test hole.

2. A method as defined in claim 1, wherein boring of said test hole is performed with a truck-mounted, hydraulically advanced drill rig.

3. A method as defined in claim 1, wherein application of said forces are at least partially performed by application of a substantially continuous pressing force.

4. A method as defined in claim 3, wherein boring of said test hole is performed with a truck-mounted, hydraulically advanced drill rig.

5. A method as defined in claim 4, wherein said continuous pressing force is applied with the hydraulic advance mechanism of said drill rig.

6. A method as defined in claim 1, wherein said first, said second, and said additional sections of casing are BXWL, said sections having threads for joining said sections formed thereon such that both the inner and the outer surfaces of said casing are essentially smooth and continuous, including joints therealong at which said sections are joined.

7. A method as defined in claim 1, wherein during the taking of each of said readings, said probe is held in a substantially stationary position within said hole, movement of said probe being performed between at least some of said readings.

8. A method as defined in claim 1, comprising the further steps of:

boring a plurality of calibration holes into said stockpile at a plurality of spaced-apart locations thereon;

collecting at least a portion of the cuttings obtained from said boring into a container of predetermined tare weight and volume having at least one wall, said container having a length of steel casing disposed therein extending the height of said container remote from the wall thereof, said length of casing being kept free from said cuttings;

inserting said probe of said nuclear depth-density gauge into said length of casing and locating said probe at a predetermined position along said length of casing;

taking a series of timed readings with said gauge;

moving said probe along said length of casing such that at the beginning of each of said readings following the first thereof, said probe is at a location along said length of casing separated by a predetermined interval from its location at the beginning of the last preceding one of said readings, whereby each of said readings taken corresponds to one of a plurality of predetermined locations along said length of casing;

weighing said container and said cuttings held therein;

calculating the density of said cuttings within said container based on the volume, tare weight and loaded weight of said container; and comparing the calculated density of said cuttings with said readings obtained with said gauge, whereby said guage may be calibrated for the material in said stockpile.

9. A method as defined in claim 8, comprising the further step of prior to inserting said probe into said casing within said container, compacting said cuttings within said container to provide material therein at approximately a predetermined density.

10. A method as defined in claim 8, wherein the bulk material within said stockpile is coal.

*11. A method of determining the density of a cohesionless bulk material in a stockpile, comprising the steps of:*

*completely boring a test hole substantially to the bottom of said stockpile;*

*following complete boring of said hole, positioning one end of a first section of casing of an outer diameter substantially equal to the diameter of said test hole at or near the opening to said hole, said casing being formed of a material and of a thickness to provide said casing with sufficient strength to withstand insertion into said hole;*

*inserting said first section partially into said hole;*

*connecting a second section of casing to the upper end of said first section;*

*inserting said second section partially into said test hole, whereby said first section is inserted further into said test hole;*

*connecting additional sections of casing and inserting said sections into said test hole until said casing sections extend the full depth of said test hole;*

*inserting the probe of a nuclear depth-density gauge into said test hole and locating said probe at a predetermined depth along said hole, said probe having a length of cable attached thereto;*

*taking a series of timed readings with said gauge; and*

*moving said probe along said test hole such that at the beginning of each of said readings following the first thereof, said probe is at a location along said test hole separated by a predetermined interval from its location at the beginning of the last preceding one of said readings, whereby each of said readings taken corresponds to one of a plurality of predetermined depths along said test hole.*

* * * * *